(12) United States Patent
Symonds (10) Patent No.: US 6,695,044 B1
(45) Date of Patent: Feb. 24, 2004

(54) HEAT EXCHANGER (75) Inventor: Keith Thomas Symonds, Staffs (GB)

(73) Assignee: Chart Heat Exchangers Limited Partnership, West Midlands (GB)

(*) Notice: Subject to any disclaimer, the term of this patent is extended or adjusted under 35 U.S.C. 154(b) by 0 days.

(21) Appl. No.: 09/937,666

(22) PCT Filed: Feb. 24, 2000

(86) PCT No.: PCT/GB00/00631

§ 371 (c)(1),
(2), (4) Date: Sep. 26, 2001

(87) PCT Pub. No.: WO00/58681

PCT Pub. Date: Oct. 5, 2000

(30) Foreign Application Priority Data

| Mar. 27, 1999 | (GB) | ................................................. 9907032 |
| Jun. 19, 1999 | (GB) | ................................................. 9914364 |

(51) Int. Cl.⁷ .............................. F28D 7/16; F28F 3/00
(52) U.S. Cl. ........................................ 165/166; 165/167
(58) Field of Search ................................ 165/165, 166

(56) References Cited

U.S. PATENT DOCUMENTS

| 3,470,950 | A | * | 10/1969 | Menkus ...................... 165/165 |
| 3,548,932 | A | * | 12/1970 | Menkus ...................... 165/165 |
| 3,983,191 | A | | 9/1976 | Schauls |
| 4,214,867 | A | | 7/1980 | Hunter et al. |
| 4,516,632 | A | | 5/1985 | Swift et al. |
| 4,729,428 | A | * | 3/1988 | Yasutake et al. ............ 165/166 |
| 4,880,055 | A | | 11/1989 | Niggemann et al. |
| 5,193,611 | A | | 3/1993 | Hesselgreaves |
| 5,212,004 | A | | 5/1993 | Böttcher et al. |
| 5,611,214 | A | | 3/1997 | Wegeng et al. |
| 5,690,763 | A | | 11/1997 | Ashmead et al. |
| 5,811,062 | A | | 9/1998 | Wegeng et al. |
| 5,829,517 | A | | 11/1998 | Schmid et al. |
| 5,836,383 | A | | 11/1998 | Zwittig |
| 5,857,517 | A | | 1/1999 | Grenier et al. |
| 6,129,973 | A | | 10/2000 | Martin et al. |

FOREIGN PATENT DOCUMENTS

| EP | 0724 127 A2 | 7/1996 |
| EP | 0724 127 A3 | 5/1997 |
| GB | 691967 | 7/1949 |
| GB | 1 484 124 | 8/1973 |
| GB | 2 093 582 | 2/1982 |
| GB | 2 305 721 | 4/1997 |
| GB | 2 334 778 | 9/1999 |
| JP | 60-256794 | 12/1985 |
| JP | 62106290 A | * 5/1987 |
| WO | WO 96/34421 | 10/1996 |
| WO | WO 98/55812 | 12/1998 |
| WO | WO 99/66280 | 12/1999 |

* cited by examiner

Primary Examiner—Leonard Leo
(74) Attorney, Agent, or Firm—Calfee, Halter & Griswold, L.L.P.

(57) ABSTRACT

A compact heat exchanger and/or fluid mixing means comprises a bonded stack of plates, the stack comprising at least one group of plates, the group comprising one or more perforated plates (10) sandwiched between a pair of primary separator plates (40, 62, 64), characterised in that each perforated plate (10) has perforations (14) arranged in rows across the plate in a first direction, with a land (16) between each adjacent pair of perforations (14) in a row and with ribs (18) between adjacent rows, the lands (16) forming barriers to flow in a first direction across the plate and the ribs (18) forming barriers to flow in a second direction across the plate, the second direction being normal to the first direction, the ribs (18) having vents (20) through a portion of their thickness, the vents (20) extending from one side of a rib (18) to the other side in the second direction, whereby flow channels are provided through the vents (20) and the flow channels lying between each adjacent pair of lands (16) provide a flow passage to cross the plates in the second direction, the passageways in the group of plates being separated from passageways in any adjacent group of plates by one of the separator plates (40).

2 Claims, 9 Drawing Sheets

HEAT EXCHANGER

RELATED APPLICATIONS

This application claims priority to foreign applications for patent, Great Britain Serial No. 9907032.8, filed Mar. 27, 1999, Great Britain Serial No. 9914364.6, filed Jun. 19, 1999, and international patent application serial number PCT/GB00/00631 filed on Feb. 24, 2000 which are hereby incorporated by reference This invention relates to a compact heat exchanger and/or fluid mixing means which incorporates a series of plates having apertures which define a plurality of passages through which fluid may flow.

Compact heat exchangers are characterised by their high "area density" which means that they have a high ratio of heat transfer surface to heat exchanger volume. Area density is typically greater than 300 $m^2/m^3$. and may be more than 700 $m^2/m^3$. Such heat exchangers are typically used to cool (or heat) process fluids.

One well known but expensive to manufacture type of heat exchanger is the so-called tube and shell heat exchanger. Essentially such heat exchangers consist of an exterior tubular shell through which run a number of longitudinally-extending smaller diameter tubes carrying one or more fluids. Other fluids, with which heat is to be exchanged, typically pass transversely across the heat exchanger such that heat is exchanged through the tube walls. A large number of tubes may be needed and they each have to be individually and accurately fixed/secured into a header plate at each end of the shell. In each case holes need to be drilled in the header plates very accurately to locate the tubes. High quality tested tubing then needs to be assembled into the plates and brazed or welded or mechanically-expanded into position. As the tubes are reduced in diameter to increase surfaces available for heat transfer and hence performance/compactness, the more difficult and expensive such configurations become to manufacture.

A second known type of heat exchanger is the so-called primary plate/secondary plate type exchanger in which a stack of plates is assembled, the stack having primary plates which directly separate two different fluid streams and secondary plates between adjacent primary plates. The secondary plates act as fins which add to the strength of structure and may be provided with perforations to provide additional flow paths for the fluids. The plates are usually bonded together by brazing but this may have the disadvantage of affecting the physical properties of the plates in the brazed regions or may introduce into the system, by means of the braze material, a potentially less satisfactory structure in terms of strength and corrosion resistance. It has been proposed to bond the plates together by diffusion bonding but a satisfactory construction that can withstand the high pressures involved has not been achieved and the fins may buckle during the bonding process.

It is an object of the present invention to provide an improved construction of this second type of heat exchanger which can be satisfactorily made by, for example, diffusion bonding or by brazing. It also aims to provide a heat exchanger construction which can also be readily adapted for use as a fluid mixing means, e.g. it can be used as a chemical reactor in which fluids which are to react together are mixed. Thus, where a reaction is exothermic, the invention may provide a means whereby the exothermic heat of reaction may be removed efficiently or, alternatively, it may be used to supply heat to an endothermic reaction. The products of the invention are also useful as fuel reformers and gas clean-up units associated with fuel cell technology.

Accordingly the present invention provides a heat exchanger or fluid mixing means comprising a bonded stack of plates, the stack comprising at least one group of plates, the group comprising one or more perforated plates sandwiched between a pair of primary separator plates, each perforated plate having perforations arranged in rows across the plate in a first direction, with a land between each adjacent pair of perforations in a row and with ribs between adjacent rows, the lands forming barriers to flow in the first direction across the plate and the ribs forming barriers to flow in a second direction across the plate, the second direction being normal to the first direction, the ribs having vents through a portion of their thickness, the vents extending from one side of a rib to the other side in the second direction, whereby flow channels are provided through the vents and the flow channels lying between each adjacent pair of lands provide a flow passageway to cross the plates in the second direction, the passageways in the group of plates being separated from passageways in any adjacent group of plates by one of the separator plates.

Although the group of plates may in fact contain only one perforated plate, there may be two or more perforated plates in the group of plates and in this embodiment adjacent perforated plates are aligned whereby the perforations of a row in one plate lie in correspondence with those of adjacent plates so that the lands and ribs of the plates lie in correspondence respectively with each other.

The invention will be more particularly described below with reference to embodiments in which the, or each, group of plates contains two or more perforated plates.

It will be appreciated that the flow passages can equally be provided in the first direction instead of the second direction, i.e. the lands are effectively the ribs containing the vents and the ribs are the lands.

The separator plates may be unperforated to provide complete separation of the passageways of the respective groups of plates. Alternatively, the separator plates may contain holes positioned and sized to provide controlled mixing of the fluids in those passageways. Such a separator plate will be referred to below as a mixing plate.

As indicated above each group of perforated plates preferably comprises at least two perforated plates but may contain three or more adjacent perforated plates as desired. A stack may, for example, comprise two or more groups of perforated plates separated by separator plates, each group containing two perforated plates having their perforations aligned in rows.

The passageways across the plates preferably traverse across the plates once only from a first edge to a second edge. However, in an alternative first specific embodiment, the passageways at one or both plate edges may be turned, e.g. by an appropriate passageway arrangement, through an angle whereby the passageway defined by the channels continues in a different direction through the stack, e.g. in the opposite direction so as to return from the second edge to the first edge.

In a second specific embodiment two or more separate passageways are provided across a group of plates whereby streams of different fluids may flow parallel to each other in the same layer provided by said group of plates. This embodiment can provide improved temperature profiles across the plates and reduced thermal stress.

Because the plates are stacked with the perforated plates of each group aligned with their perforations in rows, it will be appreciated that the solid regions (i.e. ribs and lands) of those plates between the rows of perforations and between the perforations are also aligned in rows. As the perforated plates, therefore, are stacked one above each other, the ribs and the lands are aligned through the stack and this provides strength through the assembled stack whereby the pressures generated in the bonding process can be withstood. The invention, therefore, provides a stack structure that can be bonded without the risk of the fins of the secondary plates collapsing under the pressures generated. The fins also provide the means of withstanding internal pressures in the operating streams. The rows of ribs and of lands may run in parallel lines across the plates but this is not essential.

The perforations may be of any desired shape but are preferably elongated slots.

The plates may be rectangular, square or circular for example or of any other preferred shape.

Where the plates are square or rectangular, each row of slots may extend from a first edge of the plate parallel to a second edge of the plate and for substantially the whole length of that second edge. It will be appreciated that a substantially unperforated edge or border will normally be required around the perimeter of the major faces of the plate to enable the plates of the stack to be bonded together and to provide pressure containment for the stream or streams. However, a completely unperforated border is not essential and slots in the border may be required for inlet and outlet means, for example. A plurality of rows of slots may, therefore, extend across the plate from the first edge to the opposite, third, edge.

Where the plates are circular the rows and passageways may extend from the outer perimeter as a segment of the circle towards the centre.

In one particular arrangement of the aforesaid second embodiment, a stack may be built up of one or more similar groups of plates, each group comprising an upper and a lower unperforated separator plate, a multi-passageway input layer in contact with one separator plate and a corresponding multi-passageway output layer in contact with the other separator plate, a centrally-disposed layer having at least one passageway for a first fluid and two or more transfer passageways for a fluid from each passageway of the input layer, a first auxiliary perforated plate lying between the input layer and the centally-disposed layer and a second auxiliary perforated plate lying between the output layer and the centrally-disposed layer, the perforations in the first auxiliary perforated plate being positioned to transfer fluid from each passageway of the input layer to the corresponding transfer passageways in the centrally-disposed layer and the perforations in the second auxiliary perforated plate being positioned to transfer fluid from the transfer passageways to the corresponding passageways of the output layer. The centrally-disposed layer can conveniently be formed of a plurality of main perforated plates as described above, as can the input and output layers.

The perforations or slots are preferably photochemically etched through the plates by known means, although spark erosion, punching or any other suitable means may be used, if desired.

The vents may be similarly formed and are preferably formed by photochemical etching. The vents are conveniently formed in the ribs on one surface of the plate so as to extend partially into the thickness of the rib (i.e. the thickness of the plate.). They may for example be of a depth equal to about one half of the plate. However, it may be advantageous to form vents in both surfaces of the plate, in which case the vents in one surface should preferably be staggered from those in the other surface.

For convenience the invention will hereafter be described with more specific reference to vents in the ribs although it will be appreciated, as indicated above, that they may equally be formed in the lands rather than the ribs.

A stack of adjacent perforated plates has rows of lands and rows of ribs. In the ribs between any adjacent pair of rows of lands there will be a plurality of vents forming flow channels across the plates. These flow channels together form a flow passageway that is separated from adjacent groups of flow channels, i.e. adjacent flow passageways, by the rows of lands. Thus each of the plurality of fluid channels forming an individual passageway may pass through the stack without any communication with the channels of another passageway. No mixing of fluid in those passageways can, therefore, take place and the stack functions purely as a heat exchanger with fluids at different temperatures passing through different groups of perforated plates or passing through different passageways in the same group of perforated plates.

In another embodiment of the invention there is provided intercommunication at selected positions between adjacent passageways. Thus cross-channels or cross vents may be etched or otherwise formed in the lands of the plates to provide access between adjacent passageways. The cross vents may be formed at any desired position along the passageways. Thus fluid flowing through separate passageways may be blended at pre-arranged positions on its journey through the passageways through the stack and this blending may be employed to ensure good fluid distribution and to improve heat exchange capability. (It will be appreciated that where the vents are in the lands rather than the ribs, then the cross vents will be in the ribs rather than the lands.).

Alternatively or additionally, inlets for a further fluid may be provided through the peripheral borders of the plates. Thus reactant may be introduced and mixed via the peripheral border inlets whereby the stack may be employed as a chemical reactor.

In another embodiment the invention provides a stack in which a fluid stream from one group of perforated plates may be injected into a fluid stream in an adjacent group of perforated plates. Injection holes for this purpose are provided in a mixing plate which separates the two groups of perforated plates. So-called "process intensification" can be achieved by this means, and any reaction caused by the injection of a first fluid into a second fluid can be controlled by the pressure differential between the two streams, the size, numbers and spacing of the injection holes and by sandwiching the second stream between the first stream and a coolant or heating stream, as appropriate.

The density of the slots, and hence of the ribs or fins between each row of slots, may be varied, as required. Thus the number of slots per unit width or per unit length of a plate may be arranged to suit any particular flow/pressure drop/distribution change requirements.

The vents in adjacent pairs of ribs are preferably offset from each other so that fluid flow across the plates is continually changing direction in that it must follow a sinuous route. It will be appreciated that each time the flow passes through a vent, the flow area and hence velocity changes resulting in turbulence and good heat transfer through the mass of the plates, albeit with associated pressure drops. The skilled man of the art will, therefore, be able to design a wide variety of heat exchanger characteristics and to optimise the desired effects.

The vents may be formed normal to the direction of the rib or they may be angled through the rib so as to provide an increased sideways component of movement. The vents may be tapered, especially narrowed in the direction of flow to their exit into a slot. Thus flow velocity will increase as fluid enters a vent from a slot and will increase further due to the tapering effect.

It will also be appreciated that the main flow direction across the plates is through the vents and that flow normal to that direction, i.e. through any cross vents that are provided, will normally be restricted by the provision of fewer and/or smaller cross vents.

The rows of slots may extend linearly across the plate but this is not essential and they may be arranged in other desired patterns, e.g. herringbone or chevron.

The plates may be provided at their edges with extensions, e.g. in the form of lugs to assist location of the plates in a stack. Such lugs may be designed to be broken off after the stack has been assembled, e.g. by etching partway through their thickness along a line where the lug joins the plate. Alternatively the extensions may fit together in the stack to provide, e.g. one or more tanks on the side faces of the stack. Each extension may, for example, be in the form of a flat loop, e.g. of semi-circular profile, providing an aperture at the edge of the plate, the apertures of adjacent plates forming the volume of the tank when the plates are stacked together. The loops may be attached to the plate not only at their ends but also across the aperture by means of narrow ligaments. The tanks so formed can each feed fluid, e.g. process fluid, coolant or reactant which is fed into the tanks, into the channels of one passageway. Thus a tank will be coterminous on the side of the stack with the height and width of the passageway, i.e. a group of channels, to be fed. Where the stacks are polygonal in plan, a tank may be provided on one or more of the side faces of the stack. Where the stacks are circular in plan, a number of tanks may be spaced around the perimeter as desired.

Plates used to form the products of the invention may also be provided with a hole, e.g. disposed centrally through each plate, whereby a stack of the plates has a centrally-disposed discrete passageway for a fluid stream through the stack. To compensate for the loss of flow area where such a central hole is provided, it is possible, where the plate is provided with integral tank loops, to extend the plate outwardly between adjacent loops.

The plates of a stack are preferably of the same material and are preferably thin sheets of metal, e.g. of 0.5 mm thickness or less. The material is preferably stainless steel but other metals, e.g. aluminium, copper or titanium or alloys thereof, may be used.

Inlet and outlet headers or manifolds for the different fluids may be secured to the stack after bonding together of the stack plates or, alternatively, may be formed from integral features on the plates.

As indicated above, the components of a stack may be bonded together by diffusion bonding or by brazing. Diffusion bonding, where possible, may be preferred but, in the case of aluminium, which is difficult to diffusion bond, brazing may be necessary. It is then preferable to clad the aluminium surfaces, e.g. by hot-roll pressure bonding, with a suitable brazing alloy, in order to achieve satisfactory bonding by the brazing technique, although other means to provide the braze medium may be used, e.g. foil or vapour deposition.

The invention is particularly useful where it is desired to build up a large heat exchanger by bonding side by side a number of heat exchanger units. Each unit can be provided by a stack of plates of the invention. Each stack may, for illustration purposes only, be formed of plates of, say, 300 mm width by 1200 mm length and of the desired height depending on the thickness and number of plates. Several stacks can be placed side by side on a separator plate and then the assembly closed at the top by another separator plate. If six stacks, for example, are utilised side by side, a heat exchanger of about 1800 mm flow length is achieved. All required lugs, mitre sections, spacers, etc. can be formed integrally and built up from appropriate formations on each plate and all the stacks will be of the same height, being made up of identical plates. Such an arrangement has significant advantages in the manufacture of, for example, "cryogenic" aluminium heat exchangers, which conventionally have to be built up of layers of corrugations with separate side bars. Unless the height of the side bars relative to the height of the corrugations is correct lack of uniformity and unsatisfactory brazing of the product may result.

It is known that chemical reactions can be catalysed inside a structure such as a heat exchanger by providing a deposit of catalytic material in the internal passageways through which the fluid(s) to be catalysed are passed.

The perforated plates used in the present invention are particularly useful in this respect as the surfaces of the ribs, lands and vents can receive a catalytic material coating of relatively modest thickness and the slots in the perforated plate can receive a much thicker deposit of the catalytic material. Thus, for example, where the vents extend into the thickness of the ribs to a depth equal to about one half of the plate thickness, the catalyst deposit in the slots can be of depth up to half the plate thickness without causing any blockage of the vents.

In a further embodiment of the invention is provided a heat exchanger/catalytic reactor having a plurality of passageways to contain catalytic material to promote a chemical reaction in fluid(s) to be passed through those passageways, those passageways being separated by an intervening plate from a stack of one or more parallel perforated plates having a vented rib structure according to the present invention. Thus the stack of plates separated by the intervening plate from the adjacent passageways, which later will be filled with catalytic material, is formed from perforated plates, each having perforations arranged in rows across the plate in a first direction, with a land between each adjacent pair of perforations in a row and with ribs between adjacent rows, the lands forming barriers to flow in the first direction across the plate and the ribs forming barriers to flow in a second direction across the plate, the second direction being normal to the first direction, the ribs having vents through a portion of their thickness, the vents extending from one side of a rib to the other side in the second direction, whereby flow channels are provided through the vents and the flow channels lying between each adjacent pair of lands provide a flow passage to cross the plates in the second direction.

Once the heat exchanger structure has been completed and tested, the catalytic material may be packed into its passageways. However, the packing of the catalytic material will normally be completed immediately prior to the installation of the heat exchanger/reactor into its desired use position.

The passageways to contain the catalytic material are preferably defined between parallel ribs running the length of their plates to allow convenient introduction of the catalytic material and its subsequent removal at the end of its life cycle. The passageways may be closed off at one or both ends by a mesh to retain the catalytic material.

By means of this further embodiment, heating or cooling can very effectively be provided for the chemical reaction by passing a heating or cooling fluid through the stack of plates adjacent to the layers containing the catalyst. As indicated above, this structure causes such tortuous flow and turbulence that very good heat transfer properties can be achieved, especially with gaseous fluids. The catalysed reaction may, therefore, if exothermic, be effectively cooled by passage of a suitable cooling fluid, or if endothermic, may be heated and hence initiated or improved by passage of a suitable heating fluid, through the stack.

This further embodiment may also be used in conjunction with the above-described injection construction, i.e. the heat exchanger may have a first stack containing the passageways containing catalytic material, an adjacent second stack separated from the first stack by an intervening plate with injection holes and a third stack of the cooling or heating construction. The first stack may, for example, lie between the second and third stacks, or they may lie in the order—first, second, third. Needless to say, these three stacks maybe repeated a number of times to form the complete heat exchanger/reactor.

Embodiments of the invention will now be described by way of example only with reference to the accompanying drawings in which.

Figure 1:
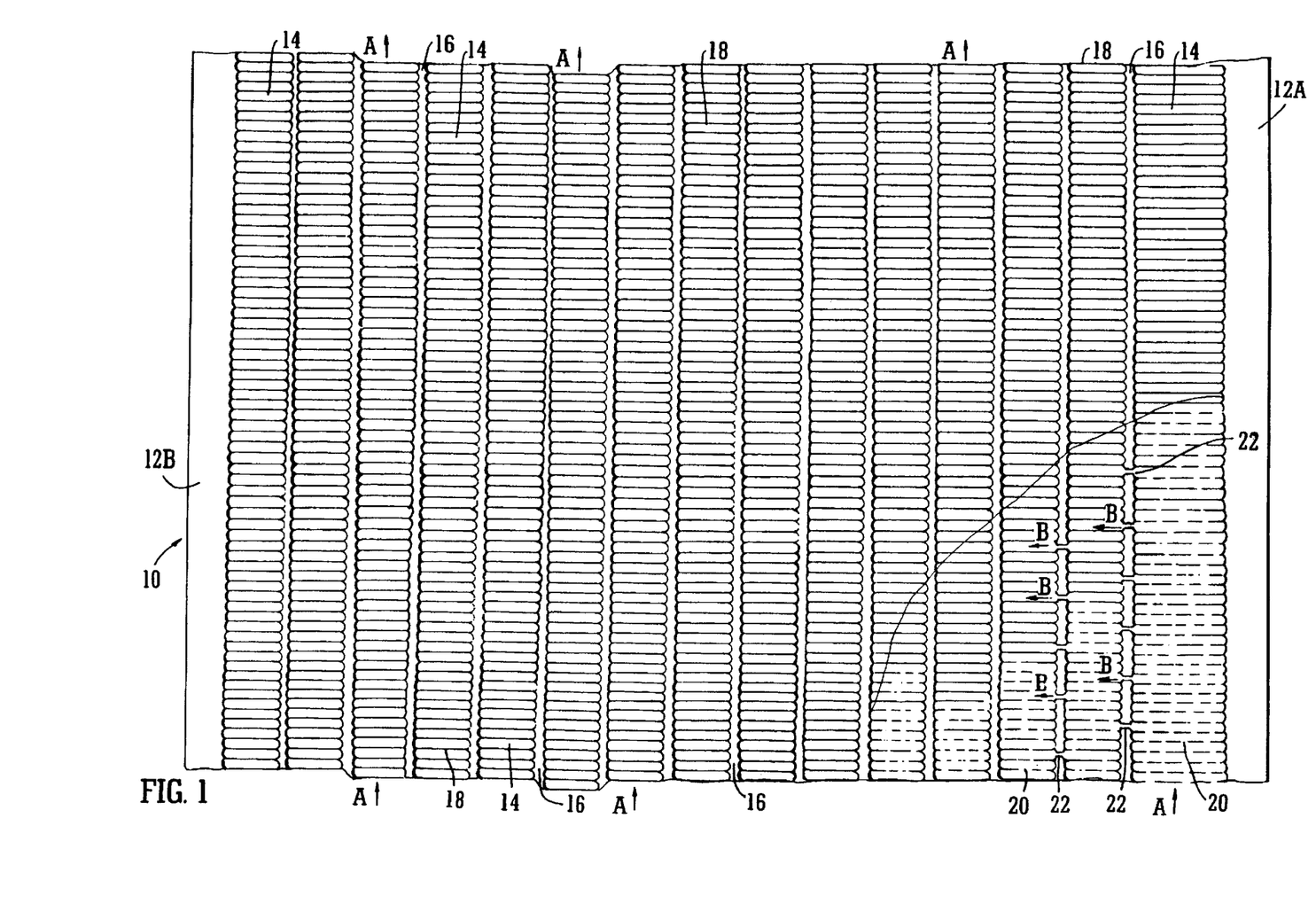
FIG. 1 is a plan view of one slotted plate for use in the invention.

In FIG. 1 a rectangular plate 10 for use in the invention has a pair of integral side bars 12A and 12B opposed across two sides of the plate.

Between side bars 12 and 12B extend a plurality of parallel rows of slots 14, each slot extending entirely through the thickness of the plate and being separated from an adjacent slot in the same row by a land 16. Lands 16 extend continuously across the plate in rows parallel to side bars 12A and 12B. Each slot is separated from an adjacent slot in the next row of slots by a rib 18. Ribs 18 extend in parallel rows across the plate between side bars 1 2A and 12B.

Each rib 18 is etched to have at least two vents 20 between each pair of lands 16 or between a land 16 and a side bar 12A or 12B. The vents extend partway through the rib thickness, i.e. into the plane of the paper, and provide communication, i.e. flow channels, between a slot in one row and an adjacent slot in the next row of slots. (Vents are only shown in one comer region of plate 10 for convenience but it will be appreciated that they are formed across the whole of the plate between the side bars.). The vents are shown and described in more detail with reference to FIGS. 2 to 6 below. The vents 20 enable the main flow passageways for a fluid passing across the plate, when stacked with one or more identical plates, to be in the direction shown by the arrows A. As the vents in adjacent ribs are staggered, the fluid passageways extending across the plate, between adjacent parallel lands 16 are tortuous.

The lands 16 are also provide with cross vents 22, again partway through their thickness, to provide cross-flow channels between adjacent passageways. Again this adds to the turbulence and heat transfer properties. It will be noted that this cross-flow, indicated by arrow B, is through fewer spaced vents so that the main thrust of the flow remains in the general direction indicated by arrow A. It will also be noted that the cross vents are staggered with respect to side vents in adjacent lands.

Figure 2:
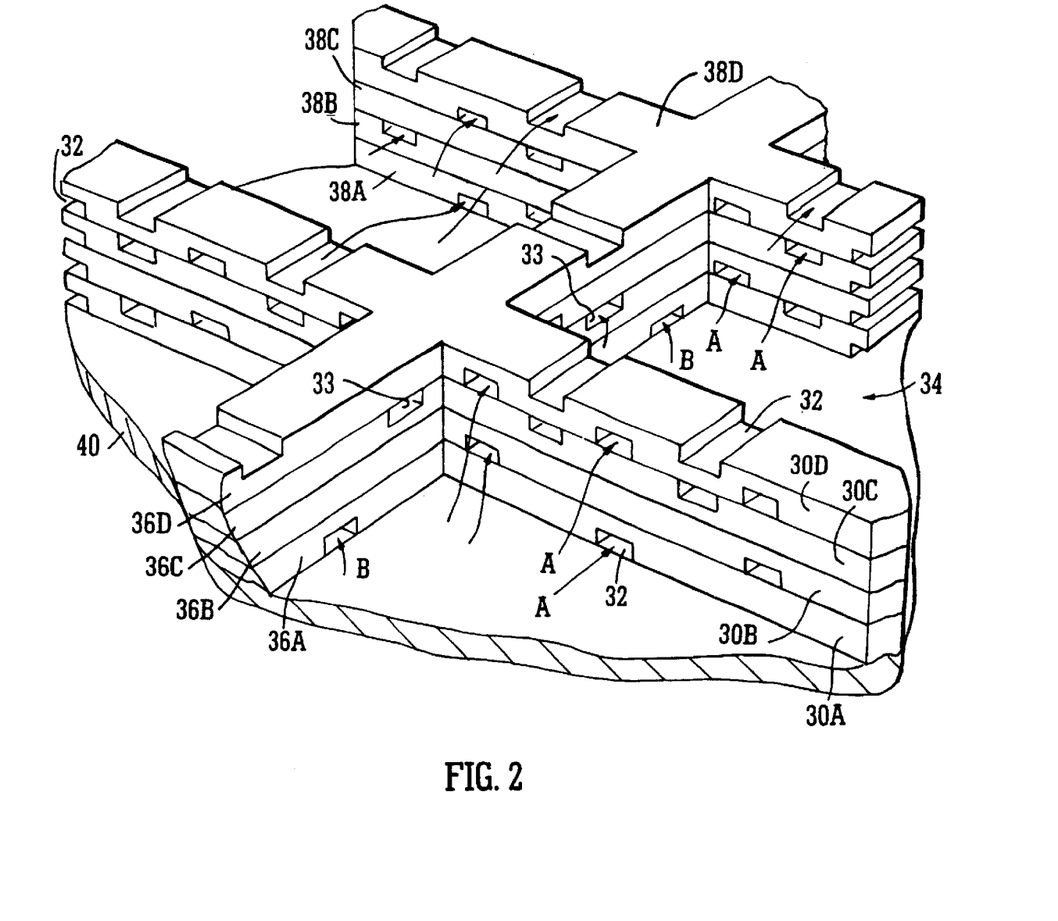
FIG. 2 is a plan view in enlarged scale of a portion of a stack of plates of the type shown in FIG. 1.

In FIG. 2 is shown a stack of four plates 30A, B, C, D, each similar to the type shown in FIG. 1. Each plate has rows of slots extending between parallel ribs 38A, B, C, D, adjacent slots being separated by lands 36A, B, C, D. The slots of each plate stack with the slots of the three other plates to form large slots 34.

An unperforated boundary plate 40 lies in contact with lowermost slotted plate 30A. Similarly another unperforated plate can lie in contact with uppermost slotted plate 30D whereby fluid passing across plates 30A to 30D is confined between the unperforated plates.

Ribs 38A, B, C, D each have vents 32 etched partway through their thickness and providing channels for fluid flow between a slot 34 on one side of the rib and another slot 34 on the other side of the rib. These vents thereby provide fluid flow passageways across the plates in the general direction of arrows A. As can be seen, the flow can be sinusoidal, from side to side and up and down owing to the staggered nature and the different height of the vents 32.

Lands 36A, B, C, D are provided with cross vents 33, which are fewer in number than vents 32, but provide flow through the lands in the direction of arrows B.

Figure 3:
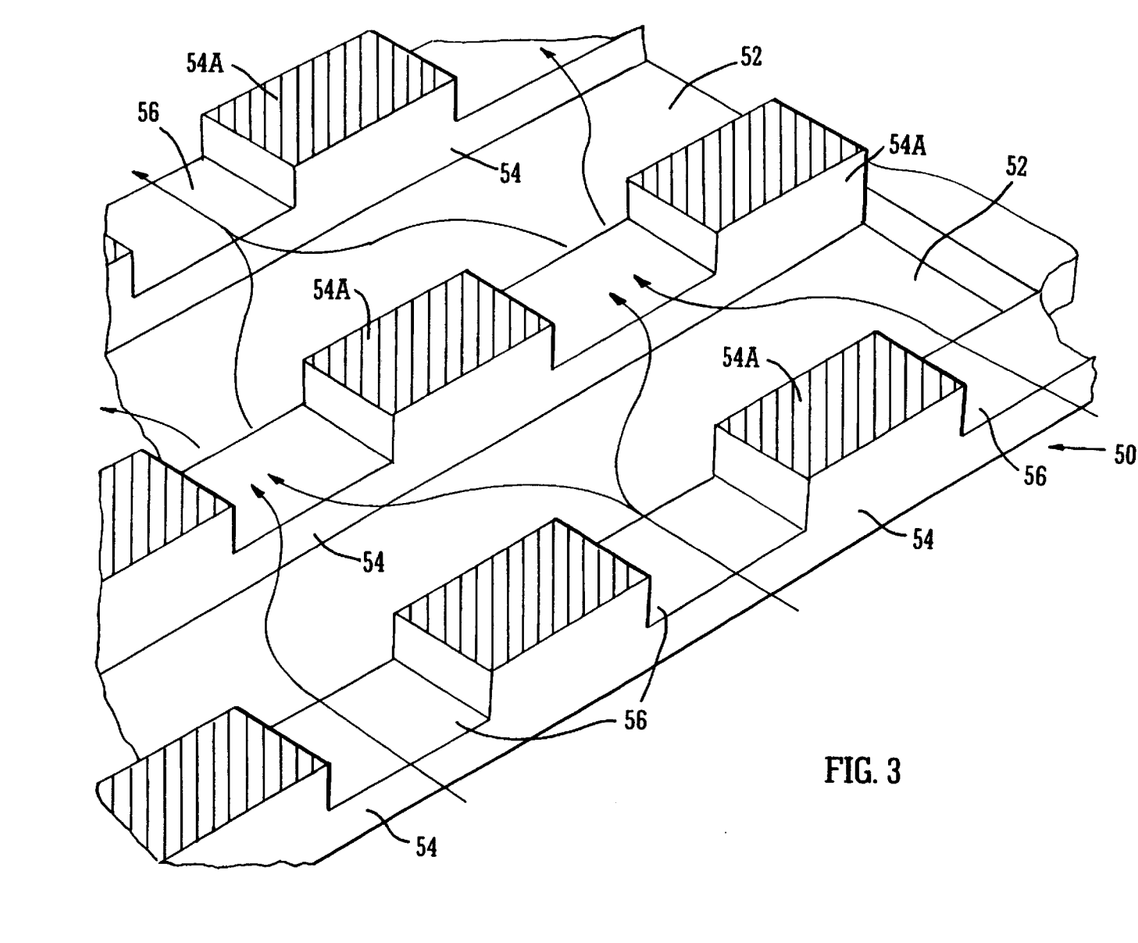
FIG. 3 is an plan view of a portion of another plate for use in the invention showing the staggering of vents.

The effect of the staggering of the vents is shown more clearly in FIG. 3. Here a plate 50 has slots 52 between ribs 54. Each rib 54 has a plurality of vents 56 etched through its thickness to provide a series of rib blocks 54A, the vents providing flow channels between adjacent slots 52. Because the vents in one rib are staggered from those in adjacent ribs, fluid flow across the plate, as indicted by the arrows, is necessarily tortuous.

As indicated above, the plate may have a coating of catalyst on its surfaces and the coating may form a thick deposit in slots 52 up to a level with the base surface of coated vents 56. This can conveniently be achieved in the manufactured structure by passing the catalytic material through the structure in known manner to achieve the deposits. In particular the structure may comprise single slotted plate layers between pairs of separator plates or pair of slotted plates one inverted on top of the other with their rib blocks 54A in contact, each pair lying between a pair of separator plates. In the latter instance, the catalyst material may be passed through the structure to leave the deposits in the slots of one plate and the structure then inverted to receive more of the catalytic material, which will then deposit in the lots of the second plate of each pair of slotted plates.

Figure 4:
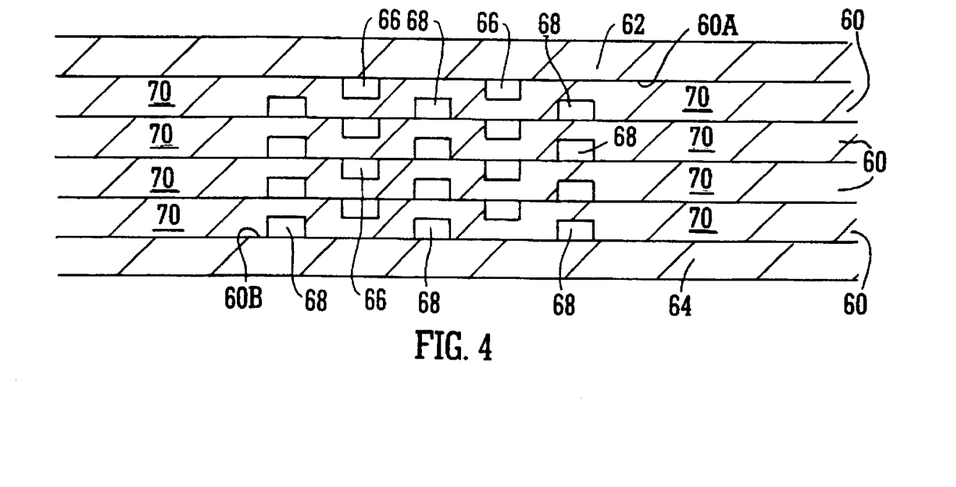
FIG. 4 is a vertical section through a portion of one stack of plates of the invention.
Figure 5:
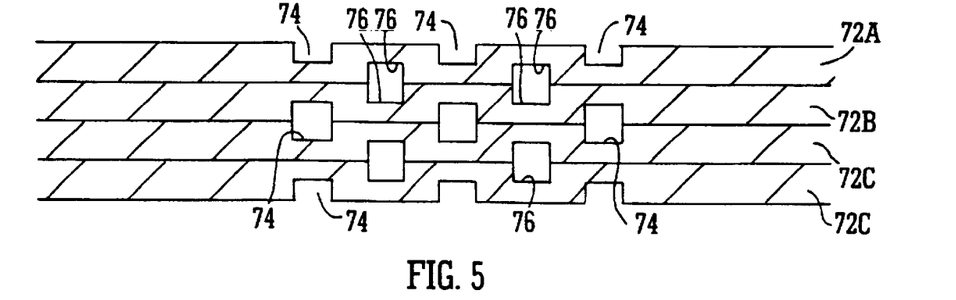
FIG. 5 is a similar view to FIG. 4 of a portion of another stack of plates of the invention.

In FIGS. 4 and 5 are shown two stacks of plates of the invention to illustrate possible variations in the siting of the vents.

In FIG. 4 are shown four identical slotted plates 60 stacked between a pair of unperforated boundary plates 62, 64. Each plate 60 has vents 66 etched into its face 60A and vents 68 etched into its opposite face 60B. Vents 66 and vents 68 are staggered from each other along the rib of the plate.

Regions 70 of each plate indicate a land and it will be appreciated that this pattern of vented ribs between adjacent lands is repeated across the plate as indicated in FIG. 1 along its entire length.

In FIG. 5 the unperforated plates corresponding to plates 62 and 64 of FIG. 4 have been removed. Again four slotted plates are stacked together. The plates, 72A, B, C and D, are identical but alternate plates have been turned over. Thus each plate has in its rib region three slots 74 on one face and two slots 76 on the other face. Plate 72A has its three slots 74 uppermost and its two slots 76 lowermost. Plate 72B has its two slots 76 uppermost and in correspondence with the two slots 76 of plate 72A. Its lowermost slots 74 are in correspondence with slots 74 of plate 72C. Similarly slots 76 of plate 72C, being lowermost, are in correspondence with the slots 76 of plate 72D. By this means larger vent channels are provided through the ribs.

Figure 6A:
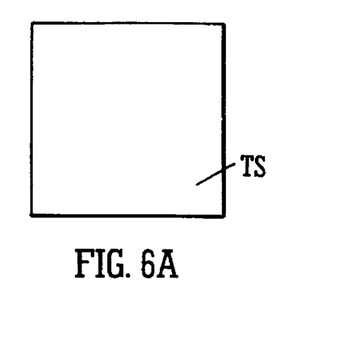
FIG. 6A is a plan view of an unperforated intervening plate, i.e. a separator plate.

FIG. 6A shows a single unperforated boundary plate TS that can be used to separate the flow passageways through one group of main perforated plates from the flow passageways of another group of main perforated plates.

Figure 6B:
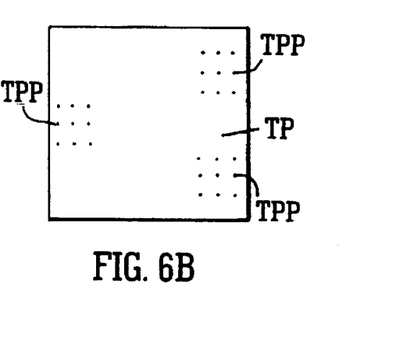
FIG. 6B is a plan view of a perforated intervening plate, i.e. a mixing plate.

FIG. 6B shows a single boundary mixing plate TP. Plate TP has groups of circular holes TPP through its thickness, although it will be appreciated that holes of different shape, size and groupings may be used. When plate TP is used as a boundary plate between two groups of main perforated plates, a first fluid flow across one group at higher pressure than a second fluid flowing across the other group will be injected into the second fluid at a controlled rate.

Figure 7:
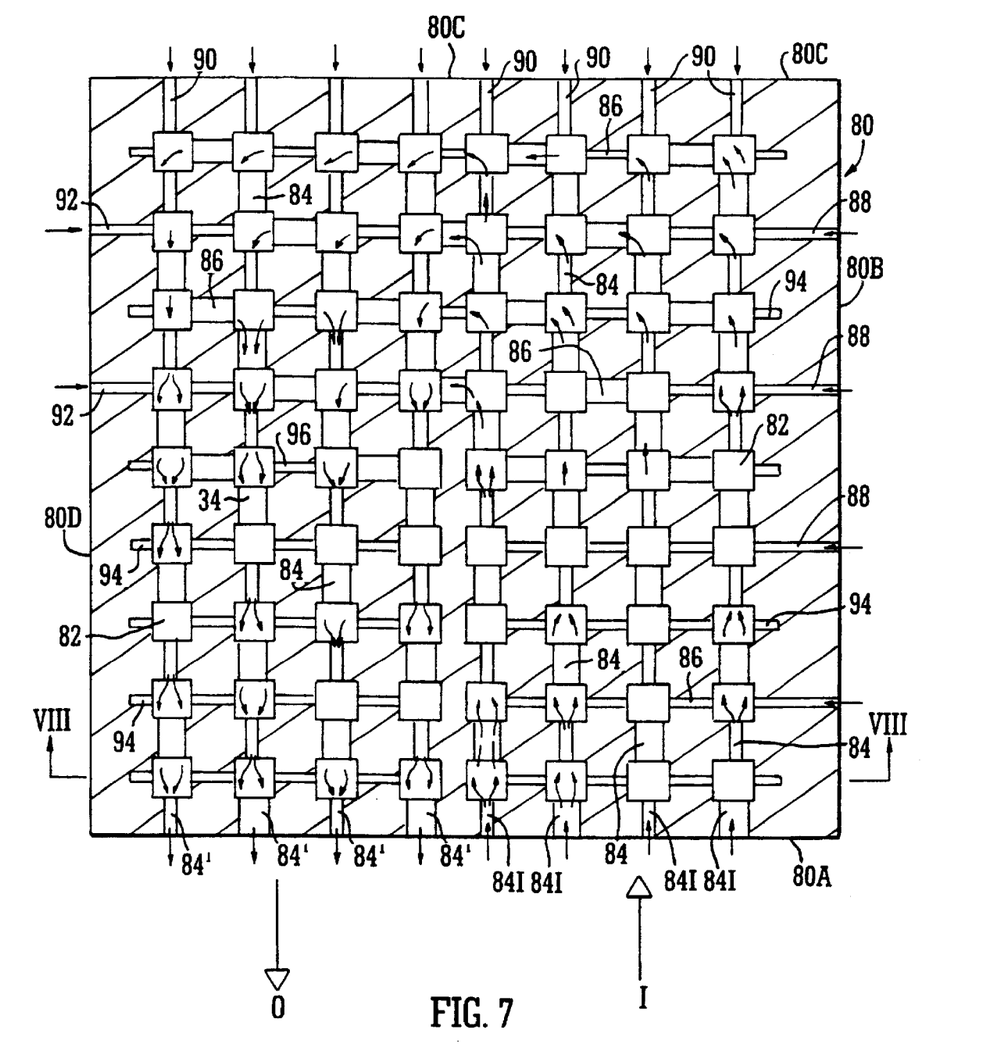
FIG. 7 is a diagrammatic plan view of a modified slotted plate of the invention.
Figure 8:
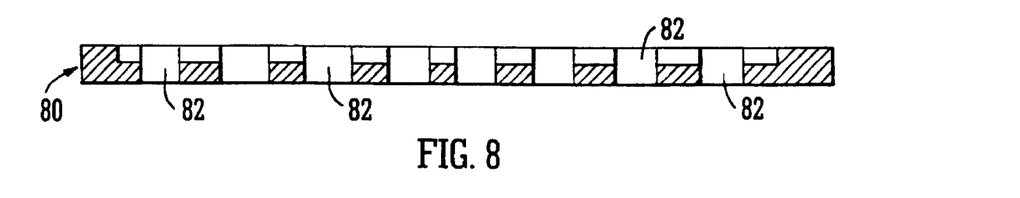
FIG. 8 is a section along line VIII—VIII of FIG. 7.

In FIGS. 7 and 8 is shown plate 80 having a series of square slots 82 etched or otherwise formed through its thickness. Slots 82 extend in rows across the plate, eight rows being shown. Between adjacent slots are channels provided by main vents 84 formed partway through the thickness of the plate and cross-channels provided by cross-vents 86 also formed partway through the thickness of the plate.

The four rows of slots in the right hand half of the plate extend from edge 80A to opposite edge 80C of the plate and are fed from an inlet I at edge 80A, fluid being injected into the slots via edge vents 84I. The fluid can cross towards edge 80C via vents 84, with some of the fluid moving to a different row of slots via the cross-vents 86.

Fluid flow is indicated generally by the arrows.

Fluid reaching the slots 82 nearest to edge 80C of the plate is forced to use one or more cross vents 86 and thereby to cross over to one of the four rows of slots extending in the left hand half of the plate. The fluid then travels back from edge 80C to edge 80A of the plate where it exits through outlet O formed by the edge vents 84'.

A second or further fluids may be injected into the fluid passing across the plate by means of side injection vents 88, 90 and 92 in edges 80B, 80C and 80D respectively of the plate.

It will be appreciated that these injection vents will be provided with a one-way valve or other e.g. pressure differential means, to prevent fluid flowing across the plate from exiting through these vents.

The injection vents may be positioned to achieve the optimum performance from the injected fluids(s). It will be noted that each slot 82 adjacent an edge of the plate is provided either with an injection vent to the edge of the plate or with a blind vent 94. These blind vents may be readily converted to full vents so that a wide range of injection patterns is possible.

It will be appreciated that the vents and cross vents in FIG. 7 are shown in simplified form for clarity and that two or more vents may be provided between each adjacent pair of slots and that the cross-sectional areas of the vents and their numbers may be varied across the plate to achieve desired flow characteristics.

Figure 9:
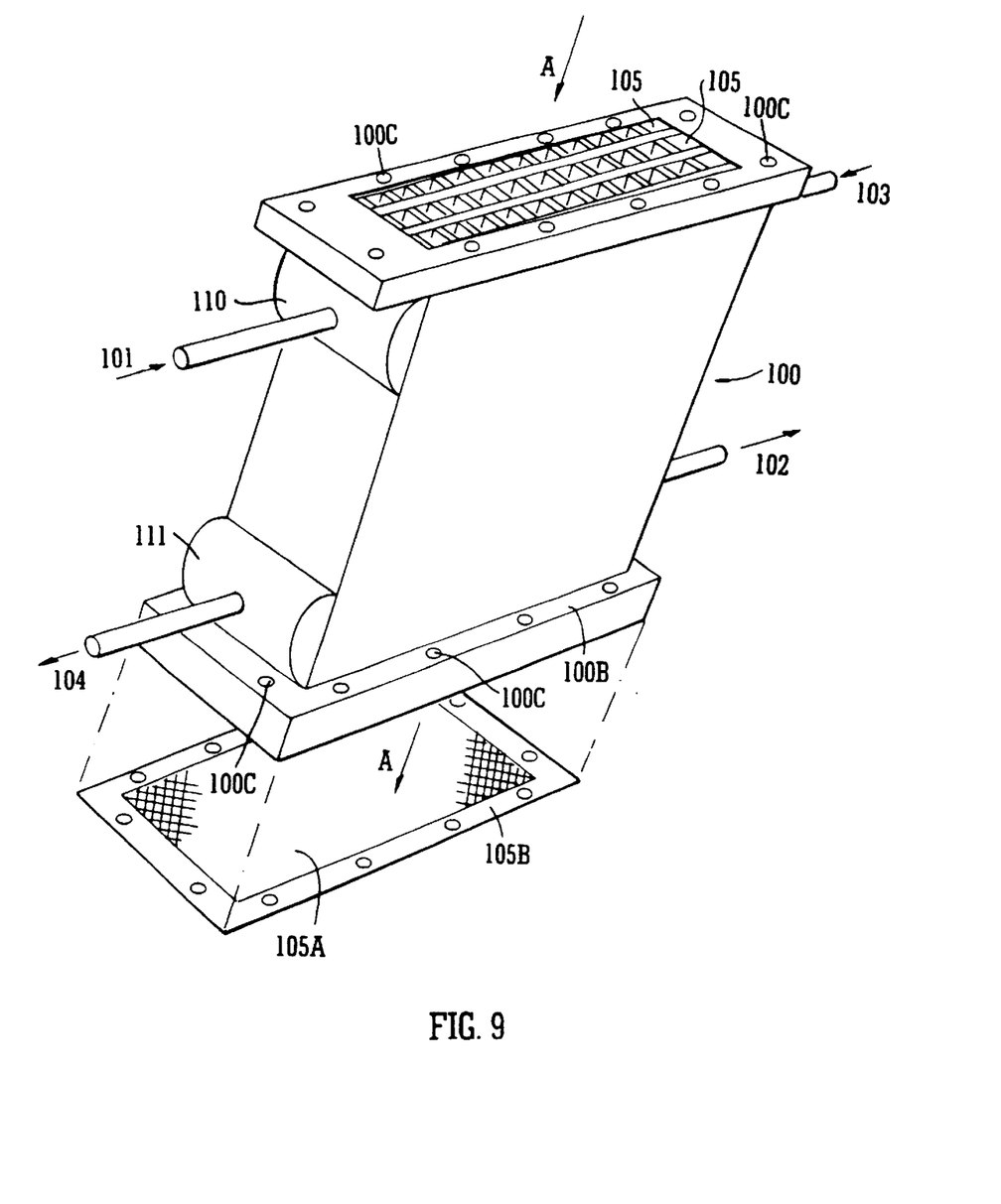
FIG. 9 is a perspective view, partly exploded, of a heat exchanger of the invention suitable for use as a catalytic reactor.

In FIG. 9 a heat exchanger/catalytic reactor 100 has an inlet 101 and an outlet 102 for coolant (or if required a heating fluid to initiate an endothermic reaction) and an inlet 103 and an outlet 104 for a reactant fluid which is to be injected as described in greater detail below into a process fluid which passes through the open-through passageways 105 through reactor 100 in the direction of arrow A. The inlets and outlets lead into and out of tanks 110 and 111 respectively from which the fluids are fed into their appropriate stacks.

Reactor 100 will of course be connected in a fluid-tight manner to a pipeline (not shown) or other means of passing the process stream from a source, through the reactor 1000 to a suitable receiving vessel by conventional means. Such connection may conveniently be made by bolting flanges 100A and 100B at either end of reactor 100 to corresponding flanges provided in the pipeline or other means using bolt holes 100C.

The passageway or channels 105 are defined in stacks of plates to be described with reference to FIGS. 11 and 12 below. These channels may be packed with catalyst and, after a period of use, the reactor 100 may be readily unbolted from its pipeline, the spent catalyst removed from channels 105 and fresh catalyst inserted so that the reactor is ready for re-use.

A mesh 105A mounted in a frame 105B can be clamped to frame 100B and/or 100A to retain the catalyst in the passageways 105.

Figure 10:
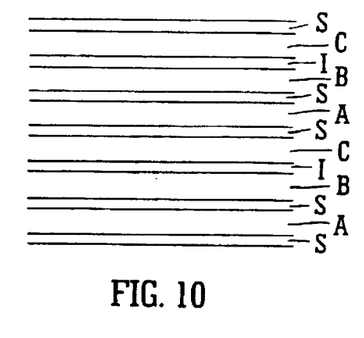
FIG. 10 is a diagrammatic representation of the plate arrangement in the heat exchanger of FIG. 9.

The order or arrangement of the plates in the reactor 100 is shown in FIG. 10.

At each end of the total stack of plates is a solid unperforated plate S, which is described with reference to FIG. 15 below.

Above bottom plate S in FIG. 10 is a stack A of plates defining passageways to receive the coolant (or heating) stream through inlet 101. The plates of stack A are described with reference to FIG. 14 below.

Above stack A is another solid unperforated separator plate S. Above that plate S is a stack of plates B defining passageways to receive a reactant fluid. The plates of stack B are described with reference to FIG. 13 below.

Above stack B is an injection or mixing plate I, which is described with reference to FIG. 16 below.

Above injection plate I is a stack C of plates defining the passageways 105 referred to above for the process fluid. The plates of stack C are described below with reference to FIG. 11 and 12.

Above stack C is another solid, unperforated separator plate S.

This structure may then be repeated with another stack A and so on as many times as is required to build up heat exchanger/reactor 100 to the desired capacity.

Figure 15:
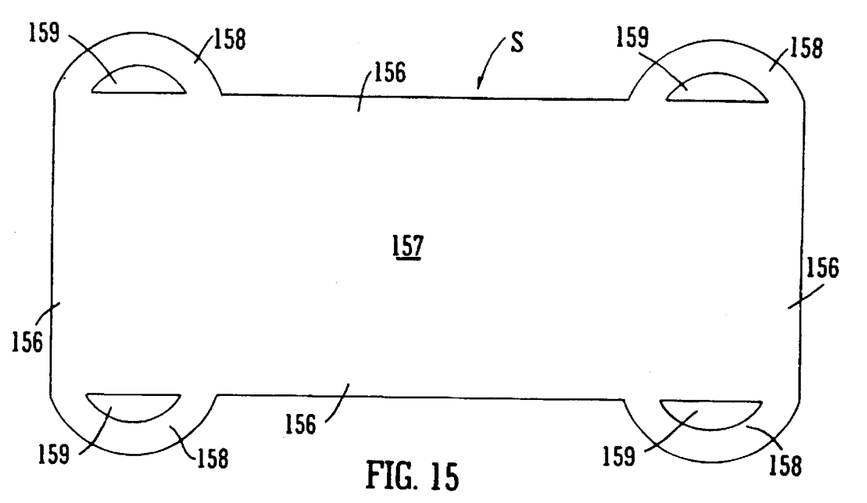
FIG. 15 is a plan view of a separator or intervening plate to lie between the stacks of FIGS. 13 and 14.

A separator plate is shown in FIG. 15. It has a rectangular plan form where border region 156 can be bonded to the corresponding border regions of adjacent plates by one of the means discussed above. Border region 156 encloses and merges into an unperforated, i.e. solid, central region 157 which prevents fluid flow passing from one side of plate S to its other side. Adjacent each corner of the plate S is a loop extension 158 defining an enclosed region or aperture 159. These loops 158 stack together with corresponding portions of the other plates stacked in the heat exchanger to form two inlet and two outlet tanks 110 and 111 respectively, one of each being visible in FIG. 9.

Figure 14:
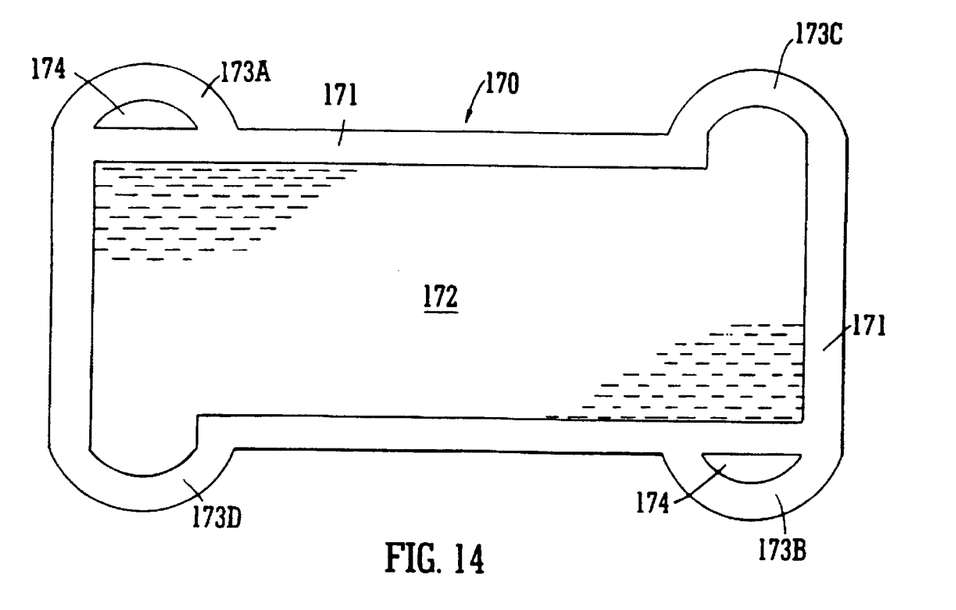
FIG. 14 is a plan view of another stack of plates similar to the plates of FIG. 13, which stack is used in the heat exchanger of FIG. 9 to provide a cooling or heating fluid as required.

The top plate of stack A is shown in FIG. 14. Two or more such plates 170 are required and each is of a rectangular form having a border region 171 for bonding to adjacent plates and a central region 172. Region 172 is of vented rib construction-not shown here but, for example, as shown in FIGS. 1 to 3. As with plate S, adjacent the corners of plate 170 are loops, two of which, 173A and 173B, in opposite corners, enclose an aperture 174 and the other two of which 173C, 173D, open into central region 172, thereby providing entry and exit for coolant fluid passing across and through stack A via inlet 101 and outlet 102 shown in FIG. 9.

Figure 13:
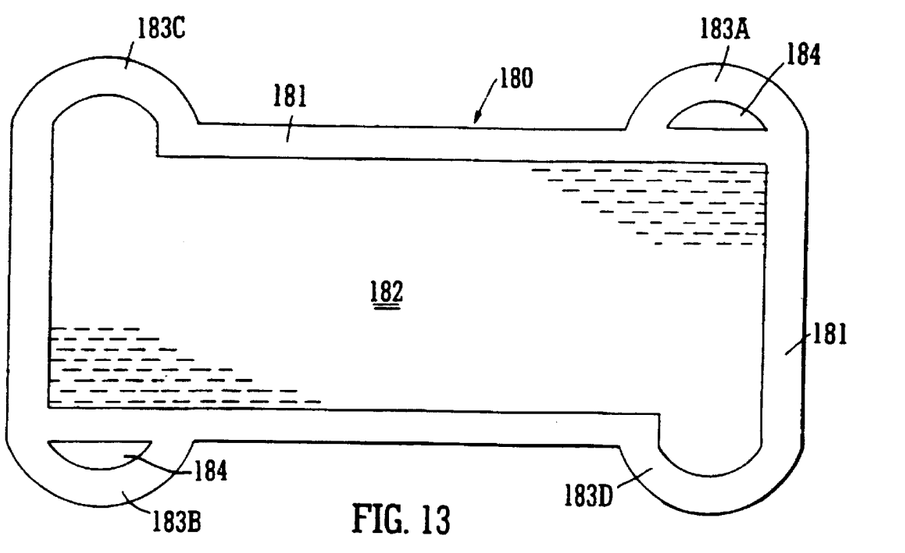
FIG. 13 is a plan view of a stack of plates used in the heat exchanger of FIG. 9 to provide reactant fluid to be injected into the process fluid.

The top plate of stack B is shown in FIG. 13. Two or more such plates 180 are required and they are of identical structure to plates 170. Thus they have a border region 181 enclosing a central pin-fin region 182. They have enclosed loops 183A and 183B and loops 183C and 183D, the latter two loops providing an inlet and an outlet for reactant fluid to pass across and through stack B via inlet 103 and outlet 104 of FIG. 9.

Figure 16:
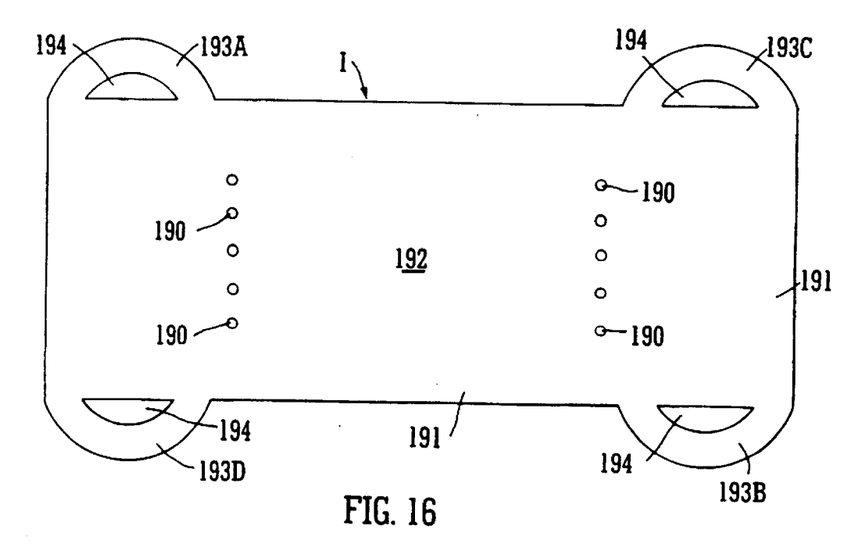
FIG. 16 is a plan view of an injection plate to lie between the stacks of FIGS. 11 and 13.

Injector plate I is shown in FIG. 16. It is of the same rectangular form as the plates described above. Its border region 191 can be bonded to the border regions of adjacent plates and it encloses and merges into a central region 192. Region 192 is not imperforate but has a series of injection holes 190 passing through its thickness. Thus reactant fluid passing through stack B on one side of plate I can be arranged to be at higher pressure than process fluid passing through stack C on the other side of plate I, whereby the reactant fluid will be injected through holes 190 into the process fluid to cause the desired chemical reaction. Holes 190 can be of size and distribution to suit the required amount of reactant fluid to be injected.

As with the previously described plates, plate I has corner loops 193A, B, C, D, and each loop encloses an aperture 194 to form part of the tanks 110 and 111 shown in FIG. 9.

Figure 11:
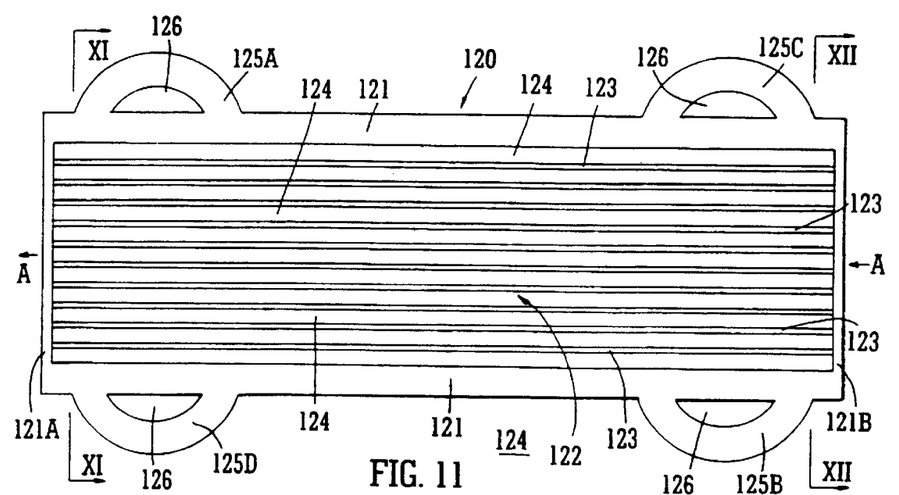
FIG. 11 is a plan of a stack of three plates used in the heat exchanger of FIG. 9 to provide the passageways for a process fluid to undergo a chemical reaction.
Figure 12:
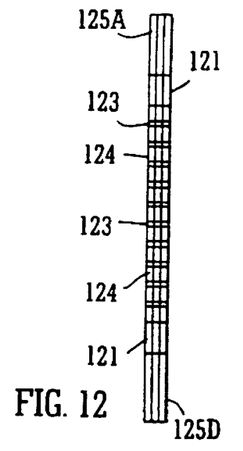
FIG. 12 is a section on line XII—XII of FIG. 10.

The plates 120 of stack C are shown in FIGS. 11 and 12. Three plates are shown in this stack although it will be appreciated that more or less plates may be used, as desired. Again, plates 120 are rectangular with a border region 121 along their two longer edges. Border regions 121A, 121B along their shorter edges are designed to be removed by cutting along lines XII—XII and XI—XI after the plates have been bonded to the other plates in the heat exchanger.

Central region 122 of each plate 120 has a series of parallel ribs 123 running along its longer length. Between adjacent pairs of ribs 123 and between each outermost rib 123 and border region 121 lie open channels 124, (equivalent to channels 105 in FIG. 9). The channels extend completely through the thickness of the plate. When ends 121A and 121B are removed process fluid can pass from one side of stack C, where ends 121B were, along channels 124 and out at the other end, i.e. where ends 121A were, as indicated by arrows A. Arrows A here correspond to arrow A in FIG. 9.

It will be appreciated that ribs 123 are held in their positions initially by being joined to ends 121A and 121B of plate 120. When the plates of the stacks are bonded together, ribs 123 bond to a plate I below or plate S above (as in the arrangement shown in FIG. 10) or to the corresponding ribs of adjacent plates 120. Thus when ends 121A and 121B are removed, the ribs remain firmly in place.

Channels 124 may be packed with catalyst to promote the reaction between the process fluid passing across and through stack A with the injected reactant fluid for stack B.

If it is desired to equalise pressure between the catalyst channels 124, vents may be formed partway through the thickness of ribs 123. Moreover, all the channels 124 in a plate 120 need not be of the same width. By this means, different flow rates may be promoted in different channels or poor uniformity of flow distribution through the channels may be compensated for by having wider channels at the edges of the plate.

Plates 122 each have corner loops 125A, B, C, D, completely enclosing apertures 126, to form part of the tanks 110 and 111.

By way of example only, plates 120 may be about 2 mm in thickness and the requisite number of such plates will be stacked together to give the desired channel height.

What is claimed is:

1. A heat exchanger or fluid mixing means (100) comprising a bonded stack of plates, the stack comprising at least one group of plates, the group comprising one or more perforated plates (10) sandwiched between a pair of primary separator plates (40, 62, 64), characterised in that each perforated plate (10) has perforations (14) arranged in rows across the plate in a first direction, with a land (16) between each adjacent pair of perforations (14) in a row and with ribs (18) between adjacent rows, the lands (16) forming barriers to flow in the first direction across the plate and the ribs (18) forming barriers to flow in a second direction across the plate, the second direction being normal to the first direction, a plurality of the ribs (18) having at least two vents (20) through a portion of their thickness between a land and an adjacent land, the vents (20) extending from one side of a rib (18) to the other side in the second direction and being staggered from rib to adjacent rib, whereby flow channels are provided through the vents (20) and the flow channels lying between each adjacent pair of lands (16) provide a flow passage to cross the plates in the second direction, the passageways in the group of plates being separated from passageways in any adjacent group of plates by one of the separator plates (40).

2. A heat exchanger or fluid mixing means according to claim 1, characterised in that the separator plates (TP) contain holes (TPP) positioned and sized to provide controlled mixing of fluid in the passageways of one group of perforated plates with fluid in an adjacent group of plates.

* * * * *